(12) United States Patent
Atsuta et al.

(10) Patent No.: US 12,214,379 B2
(45) Date of Patent: Feb. 4, 2025

(54) VIBRATORY ACTUATOR CONTROL APPARATUS AND IMAGING APPARATUS USING THE SAME

(71) Applicant: CANON KABUSHIKI KAISHA, Tokyo (JP)

(72) Inventors: Akio Atsuta, Kanagawa (JP); Hiromitsu Morita, Saitama (JP); Taiga Nagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 17/938,305

(22) Filed: Oct. 5, 2022

(65) Prior Publication Data
US 2023/0111965 A1 Apr. 13, 2023

(30) Foreign Application Priority Data
Oct. 7, 2021 (JP) .................... 2021-165610

(51) Int. Cl.
*B06B 1/02* (2006.01)
*G03B 5/02* (2021.01)
(Continued)

(52) U.S. Cl.
CPC ............ *B06B 1/0215* (2013.01); *G03B 5/02* (2013.01); *G03B 13/34* (2013.01);
(Continued)

(58) Field of Classification Search
CPC ..... B06B 1/0215; B06B 1/0238; B06B 1/023; G03B 5/02; G03B 13/34; G03B 2205/0046; G03B 2205/0061; H04N 23/6812; H04N 23/687; H04N 23/55; H04N 23/60; H04N 23/672
See application file for complete search history.

(56) References Cited

U.S. PATENT DOCUMENTS

2003/0006722 A1*  1/2003  Hayashi ............... H02N 2/14
                                                  318/114
2015/0180373 A1*  6/2015  Atsuta ................. H10N 30/802
                                                  318/116

FOREIGN PATENT DOCUMENTS

JP  2003134856 A   5/2003
JP  2019019819 A   2/2019
JP  2019198199 A   11/2019

* cited by examiner

*Primary Examiner* — Ahmed A Berhan
(74) *Attorney, Agent, or Firm* — Canon U.S.A., Inc. IP Division

(57) ABSTRACT

A vibratory actuator control apparatus includes a vibrating member, having an electro-mechanical energy conversion element, and a contact member that contacts the vibrating member. In a second case where the vibrating member and the contact member are brought from a stationary state to a stopped state, an operation sequentially passes through a third stage and a fourth stage. The third stage is for decelerating a relative movement driving speed by applying a driving voltage to the electro-mechanical energy conversion element while maintaining a control parameter of the driving voltage constant and increasing a driving frequency. The fourth stage is for decelerating the driving speed by applying the driving voltage to the electro-mechanical energy conversion element while maintaining the driving frequency constant and decreasing the control parameter of the driving voltage. A start frequency is set based on the driving frequency corresponding to a predetermined driving speed in the third stage.

4 Claims, 14 Drawing Sheets

(51) Int. Cl.
*G03B 13/34* (2021.01)
*H04N 23/68* (2023.01)
(52) U.S. Cl.
CPC ............... *G03B 2205/0046* (2013.01); *G03B 2205/0061* (2013.01); *H04N 23/6812* (2023.01); *H04N 23/687* (2023.01)

VIBRATORY ACTUATOR CONTROL APPARATUS AND IMAGING APPARATUS USING THE SAME

BACKGROUND

Field

The present disclosure relates to a vibratory actuator control apparatus and an imaging apparatus using the vibratory actuator control apparatus.

Description of the Related Art

Imaging apparatuses, such as camera apparatuses and video apparatuses, using a vibratory actuator for automatic focus (AF) driving and zoom driving have been manufactured. The vibratory actuator generates vibrations when a vibrating member formed of an electro-mechanical energy conversion element (piezoelectric element) stuck on an elastic member is applied with an alternating voltage (driving voltage) for generating vibrations in a plurality of vibrational modes of the vibrating member. The vibratory actuator obtains a driving force by frictionally driving a moving member (contact member) in pressure contact with the vibrating member (i.e., by relatively moving the vibrating member and the contact member).

Japanese Patent Application Laid-Open No. 2019-198199 discusses a drive control method for controlling a low-speed region based on a pulse width (pulse width control) and controlling a high-speed region based on a driving frequency (frequency control).

For switching between the pulse width control and the frequency control, the driving frequency at a certain driving speed is pre-stored based on previously acquired characteristics. According to the method, driving (activating) the vibratory actuator is started by using the driving frequency as the driving frequency for starting the pulse width control.

Japanese Patent Application Laid-Open No. 2003-134856 discusses a technique for storing a deactivation-time frequency and setting the deactivation-time frequency to which a certain quantity is added, as the starting frequency for the next operation. The technique is based on the frequency control.

SUMMARY

The present disclosure is directed to providing a vibratory actuator control apparatus capable of restricting changes in the control characteristics due to changes in the actuator characteristics.

According to an aspect of the present disclosure, a vibratory actuator control apparatus includes a vibrating member having an electro-mechanical energy conversion element, a contact member configured to come into contact with the vibrating member, and a controller configured to control relative movements of the vibrating member and the contact member due to vibrations to be generated when a driving voltage is applied as a plurality of alternating voltages to the electro-mechanical energy conversion element, wherein, in a first case where the vibrating member and the contact member are brought from a stopped state to a stationary state, an operation sequentially passes through a first stage and a second stage, wherein, in a second case where the vibrating member and the contact member are brought from the stationary state to the stopped state, the operation sequentially passes through a third stage and a fourth stage, wherein the first stage is for accelerating a driving speed at which the vibrating member and the contact member relatively move by applying the driving voltage to the electro-mechanical energy conversion element while maintaining a driving frequency as a frequency of the driving voltage at a start frequency as a preset driving frequency and increasing a control parameter of the driving voltage, wherein the second stage is for accelerating the driving speed by applying the driving voltage to the electro-mechanical energy conversion element while maintaining the control parameter of the driving voltage constant and decreasing the driving frequency from the start frequency, wherein the third stage is for decelerating the driving speed by applying the driving voltage to the electro-mechanical energy conversion element while maintaining the control parameter of the driving voltage constant and increasing the driving frequency, wherein the fourth stage is for decelerating the driving speed by applying the driving voltage to the electro-mechanical energy conversion element while maintaining the driving frequency constant and decreasing the control parameter of the driving voltage, and wherein the start frequency is set based on the driving frequency corresponding to a predetermined driving speed in the third stage.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings.

The driving frequency and the pulse width will be described below with reference to FIG. 13.

Figure 13:
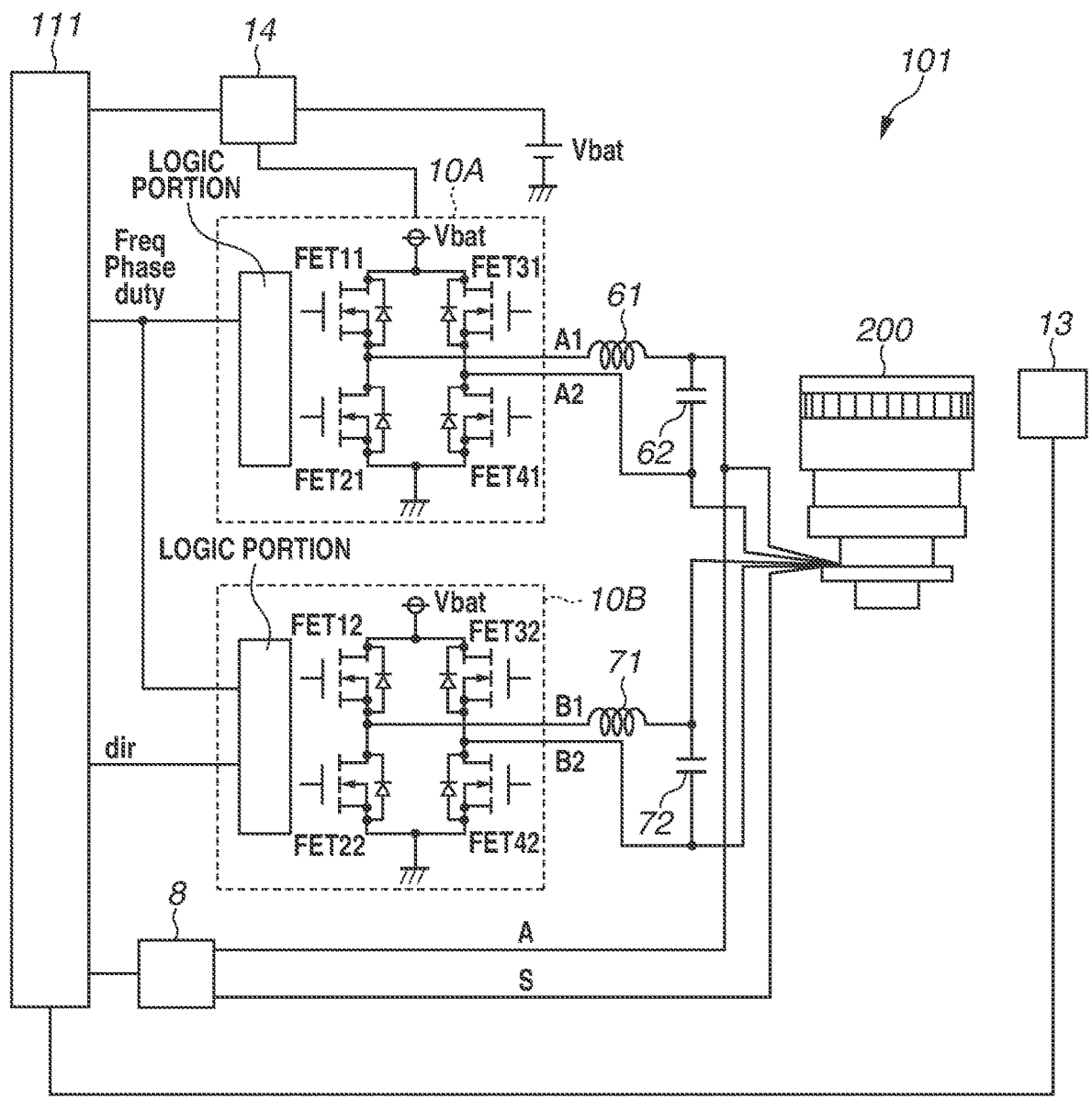
FIG. 13 illustrates the vibratory actuator, and a conventional vibratory actuator control circuit (control apparatus) included in the vibratory driving apparatus.

FIG. 13 illustrates a configuration of a driving circuit for the above-described vibratory actuator. The driving circuit includes the vibratory actuator 200, and a control apparatus (microcomputer unit) 111 for the vibratory actuator 200. The control apparatus 111 such as a microcomputer controls the vibratory actuator 200. Hereinafter, the control apparatus 111 for the vibratory actuator 200 is also referred to as a microcomputer unit.

The driving circuit for the vibratory actuator includes an oscillator unit and a switching voltage generation unit 10A for generating an alternating voltage (AC signal) for producing a first mode (A-mode) vibration based on an instruction value of the microcomputer unit 111. The driving circuit for the vibratory actuator also includes an oscillator unit and a switching voltage generation unit 10B for generating an alternating voltage (AC signal) for producing a second mode (B-mode) vibration based on an instruction value of the microcomputer unit 111.

The oscillator unit can change the phase difference between the alternating voltage (AC signal) for producing the A-mode vibration and the alternating voltage (AC signal) for producing the B-mode vibration from 0 to 360 degrees (hereinafter the above-described phase difference is also simply referred to as a phase difference).

The switching voltage generation unit 10A is a part of the means for generating the alternating voltage (AC signal) for producing the A-mode vibration. More specifically, the switching voltage generation unit 10A is a switching circuit (means) for switching the voltage of the power source (Vbat) by using Field Effect Transistors (FETs) 11 to 41 as switching elements. The voltage generated by the switching voltage generation unit 10A (switching voltage) is amplified through the boosting effect by the combination of a coil 61 and a capacitor 62 and then applied to the A-mode driving terminal of the vibratory actuator 200.

The switching voltage generation unit 10B is a part of the means for generating the alternating voltage (AC signal) for producing the B-mode vibration. More specifically, the switching voltage generation unit 10B is a switching circuit (means) for switching the voltage of the power source (Vbat) by using FETs 12 to 42 as switching elements. The voltage generated by the switching voltage generation unit 10B (switching voltage) is amplified through the boosting effect by the combination of a coil 71 and a capacitor 72 and then applied to the B-mode driving terminal of the vibratory actuator 200.

A power voltage detection circuit 14 detects the amplitude of the voltage of the power source Vbat. The power source Vbat connected with the switching voltage generation units 10A and 10B generates a switching pulse by switching the voltage of the power source Vbat.

The driving frequency means the frequency at which the voltage of the power source (Vbat) is switched by the above-described switching circuit. Hereinafter, a control method for changing the driving speed by changing the driving frequency is referred to as frequency control.

After the voltage of the power source (Vbat) is switched by the switching circuit, the voltage of the power source (Vbat) is output from A1, A2, B1, and B2 as switching pulses.

The pulse width means the duration of the switching pulse. In a case where the ON/OFF duration is 1:1, the duty ratio is 0.50 (50%). In a case where the ON/OFF duration is 1:3, the duty ratio is 0.25 (25%). Hereinafter, a control method for changing the driving speed by changing the pulse width is referred to as pulse width control.

A unit 8 obtains the phase difference between the applied voltage and the detected voltage provided on the vibratory actuator to monitor the resonant state.

A position detection unit I3 is a means for detecting a rotational position of a rotation unit formed of, for example, a photo-interrupter and a slit plate. Based on the result obtained by the position detection unit I3, positional information and velocity information about a rotating member is transferred to the microcomputer unit 111 that controls the rotational position (driving position) and the rotational speed (driving speed) of the vibratory actuator 200 based on the information.

Figure 14A:
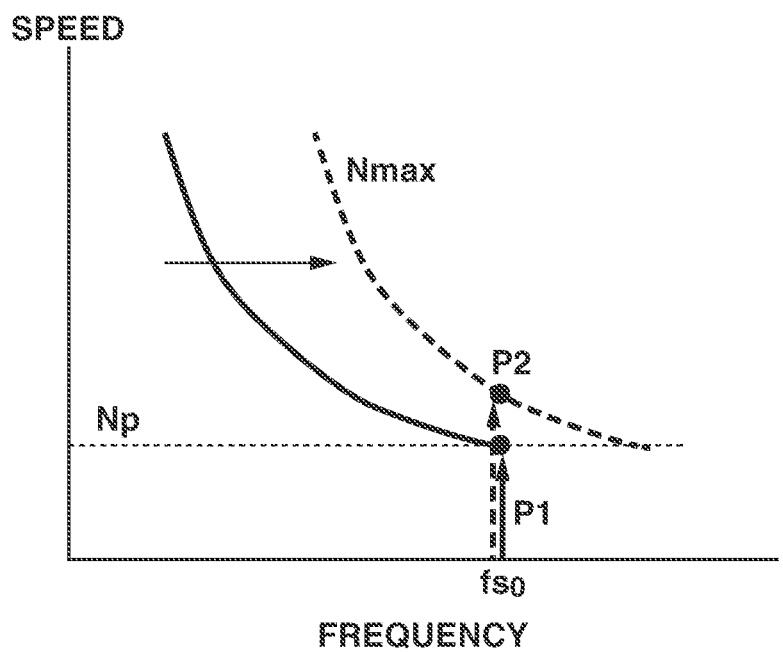
FIG. 14A illustrates a relation between the frequency and the speed in a control operation to be performed by the conventional vibratory actuator control apparatus.
Figure 14B:
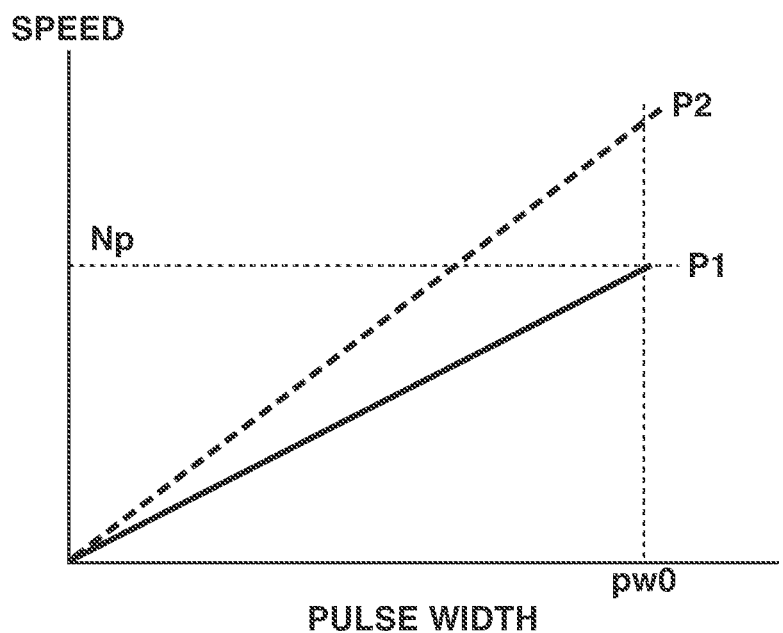
FIG. 14B illustrates a relation between the pulse width and the speed in the control operation to be performed by the conventional vibratory actuator control apparatus.

FIGS. 16A and 16B illustrate relations between driving parameters (the driving frequency, and the pulse width as a control parameter for the driving voltage) of the vibratory actuator and the driving speed. With reference to FIG. 14A, the horizontal axis indicates the frequency, and the vertical axis indicates the speed. With reference to FIG. 14B, the horizontal axis indicates the pulse width at a driving frequency $fs_0$, and the vertical axis indicates the speed at the driving frequency $fs_0$. Nmax indicates the speed when the vibratory actuator operates at the maximum speed. Np indicates the speed most suitable for switching from the pulse width control to the frequency control.

The speed is increased in a case where the pulse width is gradually increased from the preset driving frequency $fs_0$ when the vibratory actuator is to be operated, as illustrated in FIG. 14B. When the pulse width becomes (reaches) pw0 at which the frequency control is selected, the driving speed becomes a switching speed Np. To achieve a higher speed than the switching speed Np, the control apparatus 111 increases the speed based on the driving frequency in the frequency control illustrated in FIG. 14A.

In a frequency control region, the speed is increased as the driving frequency is decreased. When the driving frequency reaches the frequency corresponding to the maximum speed Nmax, the speed control operation is selected to increase and decrease the frequency based on a difference from a target speed. In the normal operation, when the vibratory actuator is to be stopped at a target position, the driving frequency is increased to decrease the speed, contrary to the current operation, the pulse width control is selected, and then the pulse width is decreased so that the vibratory actuator is stopped.

However, when the above-described operation is performed and when various parameters such as the environmental parameters (e.g., temperature and humidity) and external parameters (e.g., load torque) change, the relation between the frequency and the speed (actuator characteristic) changes from the solid line to the dotted line illustrated in FIG. 14A.

Accordingly, the relation between the pulse width and the speed (actuator characteristic) also changes from P1 (solid line) to P2 (dotted line) in FIG. 14B. When the actuator characteristic changes to increase the inclination like in a case where the actuator characteristic changes from P1 (solid line) to P2 (dotted line), the speed change with respect to the pulse width change increases, and as a result, the speed change (control characteristic) is increased when the pulse width is changed. Accordingly, an abrupt speed variation and oscillation will occur.

Figure 1A:
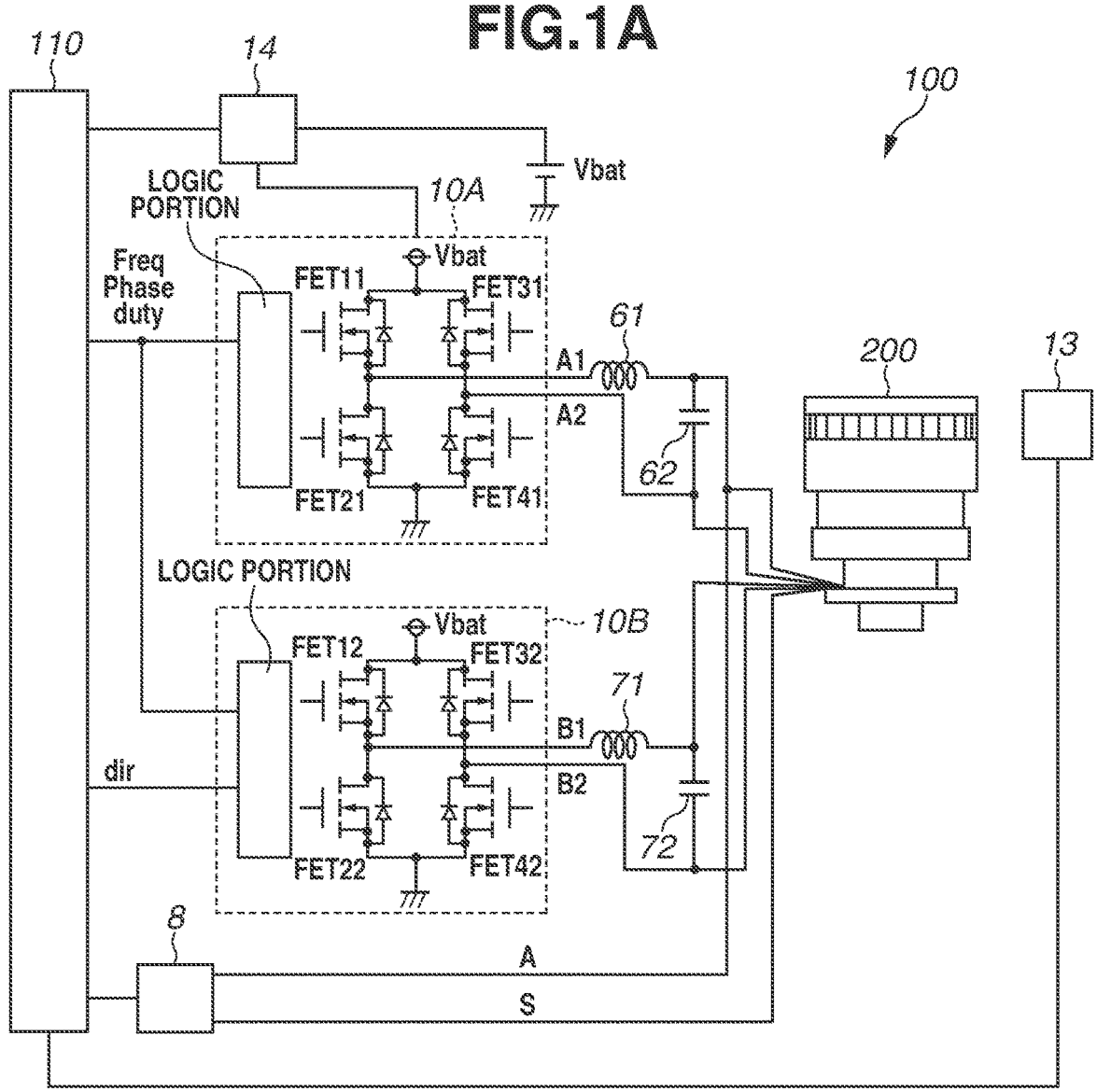
FIG. 1A illustrates a vibratory actuator and a vibratory actuator control circuit (control apparatus) of the present disclosure included in a vibratory driving apparatus.

A first exemplary embodiment will be described below with reference to FIGS. 1A to 1C, 2, and 3. FIG. 1A illustrates a vibratory actuator, and a vibratory actuator control circuit (control apparatus) of the present disclosure included in a vibratory driving apparatus.

The configuration of the vibratory actuator driving circuit (control apparatus) is the same as the configuration of the vibratory actuator control circuit (control apparatus) in FIG. 13 except for the microcomputer unit. The driving sequence of a microcomputer unit 100 corresponds to the present disclosure, descriptions of the configuration of the driving circuit (control apparatus) other than the microcomputer unit will be omitted.

Figure 1B:
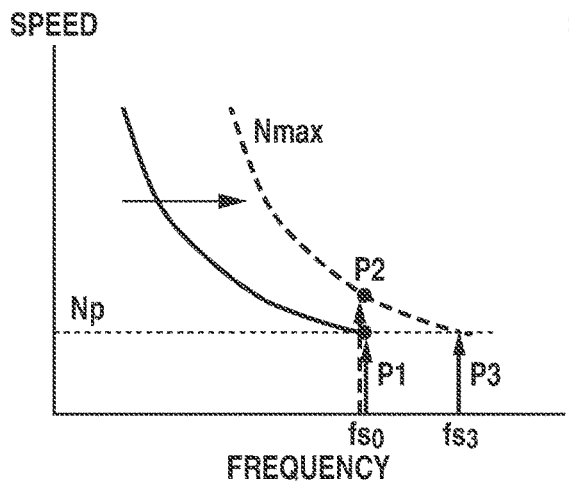
FIG. 1B illustrates a relation between the frequency and the speed in the vibratory driving apparatus according to a first exemplary embodiment.
Figure 1C:
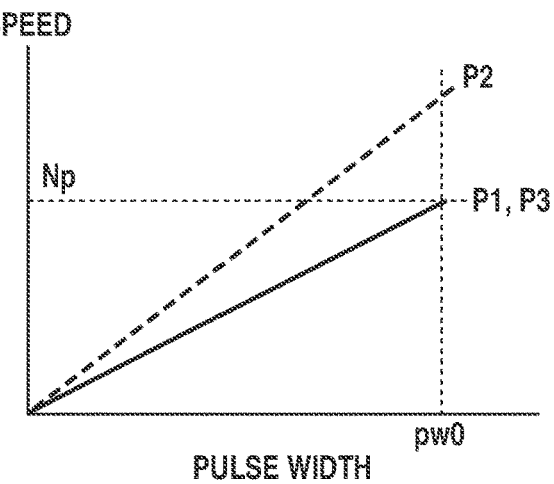
FIG. 1C illustrates a relation between the pulse width and the speed in the vibratory driving apparatus according to the first exemplary embodiment.

FIGS. 1B and 1C illustrate a method for coping with changes of environmental parameters and external parameters in the vibratory actuator control apparatus according to the present exemplary embodiment (first exemplary embodiment). FIG. 1B illustrates a relation between the frequency and the speed (frequency characteristic). FIG. 1C illustrates a relation between the pulse width and the speed (pulse width characteristic) of the vibratory actuator. Changes of P1 and P2 due to changes in the environmental parameters and external parameters are the same as changes in FIGS. 16A and 16B.

P1 indicates a pulse width characteristic corresponding to a frequency characteristic of the solid line when the start frequency is $fs_0$. P2 indicates a pulse width characteristic corresponding to a frequency characteristic of the dotted line when the start frequency is $fs_0$. P3 indicates a pulse width characteristic corresponding to a frequency characteristic of the dotted line when the start frequency is $fs_3$. The "start frequency" means a driving frequency preset as the driving frequency to be used when driving (activating) the vibratory actuator is started.

According to the present exemplary embodiment (first exemplary embodiment), in a case where the frequency characteristic is shifted (changed) from the solid line to the dotted line in FIG. 1B due to changes in the environmental parameters and external parameters, the control apparatus 111 changes the start frequency from $fs_0$ to $fs_3$. Then, as illustrated in FIG. 1C, the pulse width characteristic changes from the inclination P2 to the inclination P3 that is the same as the inclination P1 as the optimum inclination.

In a case where the control characteristics of the vibratory actuator are changed due to changes in the environmental parameters and external parameters, the start frequency is changed from $fs_0$ to $fs_3$ so that the same control as the conventional control can be performed.

According to the present exemplary embodiment (first exemplary embodiment), a means for determining $fs_3$ (vibratory actuator control apparatus) is provided. The vibratory actuator control apparatus will be described in detail below.

Figure 2:
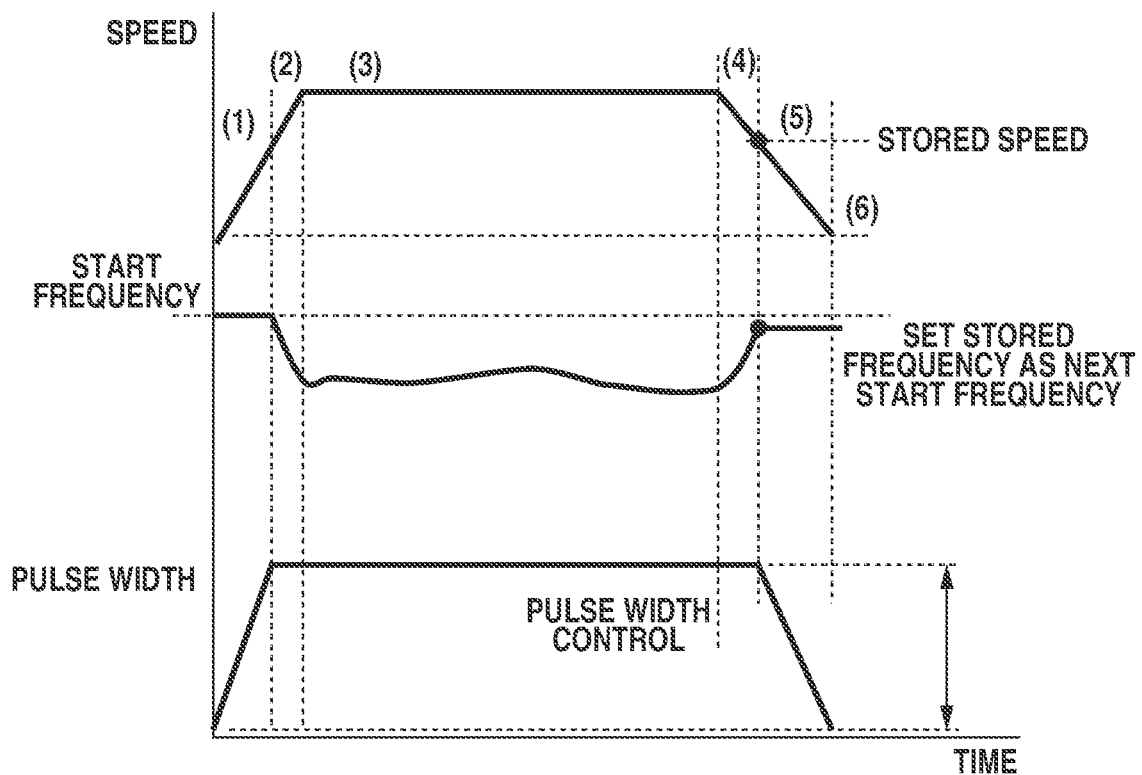
FIG. 2 illustrates a relation between the time, speed, frequency, and pulse width in the vibratory driving apparatus according to the first exemplary embodiment.

FIG. 2 illustrates an operation for controlling the vibratory actuator and an operation for acquiring a switching frequency at which the pulse width control and the frequency control according to the present exemplary embodiment (first exemplary embodiment) are switched. The horizontal axis indicates time, and the vertical axis indicates the speed, frequency, and pulse width.

Figure 3:
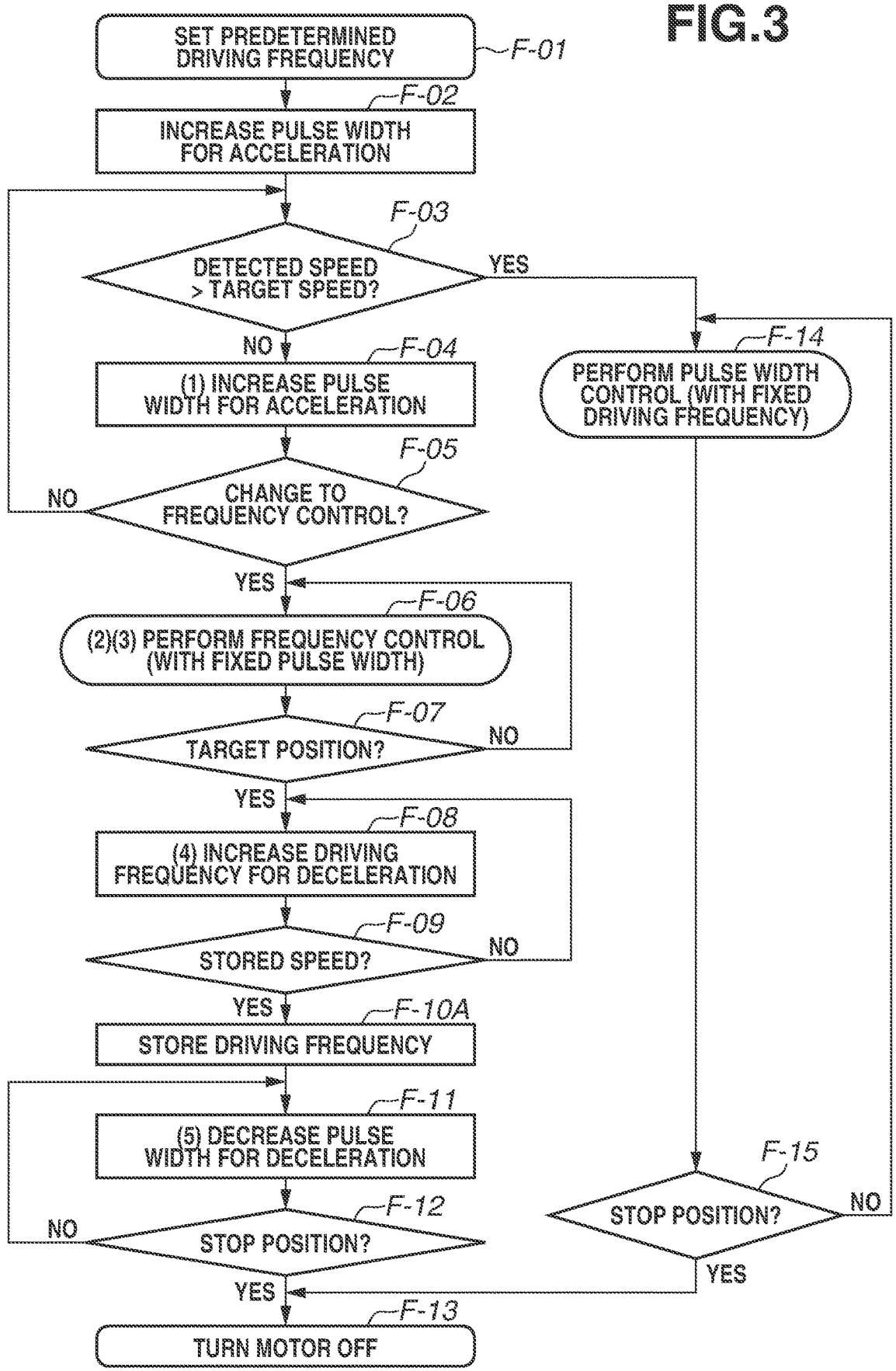
FIG. 3 is a flowchart illustrating an algorithm according to the first exemplary embodiment.

FIG. 3 is a flowchart illustrating an algorithm according to the present exemplary embodiment (first exemplary embodiment). The flowchart illustrated in FIG. 3 will be described below with reference to FIGS. 1B, 1C, and 2.

The speed control according to the present exemplary embodiment (first exemplary embodiment) will be described below. As the speed control, the pulse width control is performed in the low-speed region where the vibratory actuator is controlled at a relatively low speed, and the frequency control is performed in the high-speed region where the vibratory actuator is controlled at a high speed.

In step F-01, before the control apparatus 111 starts to drive (activate) the vibratory actuator, the control apparatus 111 sets the frequency predetermined based on the premeasured actuator characteristics as the driving frequency (start frequency $fs_0$).

In step F-02, the control apparatus 111 starts the pulse width control. More specifically, the control apparatus 111 maintains (fixes) the driving frequency at the preset driving frequency (start frequency) when the control apparatus 111 starts to drive (activate) the vibratory actuator, and then increases the pulse width (driving voltage control parameter) to accelerate the vibratory actuator. In this case, the control apparatus 111 gradually increases the pulse width to accelerate the vibratory actuator so that driving (activating) the vibratory actuator is smoothly started.

In a case where the detected speed detected by the position detection unit 13 is equal to or lower than the target speed (NO in step F-03), then in steps F-04, F-05 (NO), F-03 (NO), and F-04 . . . , the control apparatus 111 repeats operations for gradually increasing the pulse width to accelerate the vibratory actuator. The above-described operation is the operation in the region (1) in FIG. 2 (first stage).

In a case where the pulse width becomes a predetermined value (in a case where the pulse width reaches the maximum value in a settable range) (YES in step F-05), then in step F-06, the control apparatus 111 selects the frequency control. More specifically, the control apparatus 111 changes the driving frequency while maintaining (fixing) the pulse width at the predetermined value (hereinafter the maximum value is referred to as the "pulse width maximum value").

In step F-06, in the frequency control, to increase the driving speed until the detected speed of the vibratory actuator reaches the target speed, the control apparatus 111 decreases the driving frequency to accelerate the vibratory actuator. The operation is the operation in the region (2) in FIG. 2 (second stage). The operation that sequentially passes through the regions (1) and (2) in FIG. 2 in this order is the operation to be performed in a case where the states of the vibrating member and the contact member included in the vibratory actuator are changed from the stopped state to the stationary state (first case).

In step F-06, in the frequency control, in a case where the detected speed reaches the target speed, the control apparatus 111 increases and decreases the driving frequency based on the difference (velocity error) between the detected speed of the vibratory actuator and the target speed. The operation is the operation in the region (3) in FIG. 2 (stationary state operation).

In brief, in the frequency control, the control apparatus 111 performs the acceleration control until the detected speed reaches the target speed and performs the constant speed control in which the driving speed is stabilized at the target speed.

In a case the vibratory actuator comes close to the target position (YES in step F-07), then in step F-08, the control apparatus 111 starts a deceleration operation. More specifically, the control apparatus 111 increases the driving frequency while maintaining the pulse width (driving voltage control parameter) constant, to decelerate the vibratory actuator. The operation is the operation in the region (4) in FIG. 2 (third stage). The control apparatus 111 can determine whether the vibratory actuator comes close to the target position, for example, by determining whether the number of pulses produced by an incremental encoder becomes close to the set number of pulses.

In a case where the deceleration is continued and the speed is decreased to a predetermined driving speed (stored speed) at which the stored frequency is to be stored (YES in step F-09), then in step F-10A, the control apparatus 111 stores the driving frequency when the driving speed reaches the stored speed (stored frequency).

The stored speed is denoted by Np illustrated in FIGS. 1B and 1C, and is a preset speed suitable for switching a control operation between the pulse width control and the frequency control. The driving frequency when the driving speed reaches the stored speed (switching frequency) is set as the stored frequency.

In step F-11, the control apparatus 111 continues the deceleration operation. More specifically, the control apparatus 111 decreases the pulse width while maintaining (fixing) the driving frequency at the stored frequency, to decelerate the vibratory actuator. The operation is the operation in the region (5) in FIG. 2 (fourth stage). The operation that sequentially passes through the region (4) (third stage) and the region (5) (fourth stage) in FIG. 2 in this order is the operation to be performed in a case where the states of the vibrating member and the contact member included in the vibratory actuator are changed from the stationary state to the stopped state.

In a case where the vibratory actuator reaches the target position (stop position) (YES in step F-12), then in step F-13, the control apparatus 111 stops driving the vibratory actuator (turns the motor OFF) to stop the vibratory actuator. The operation is the operation in the region (6) in FIG. 2.

According to the present exemplary embodiment (first exemplary embodiment), the control apparatus 111 stores the driving frequency when the driving speed reaches the stored speed in the third stage (stored frequency) and then sets the stored frequency as the start frequency to be used when the control apparatus 111 starts to drive (activate) the vibratory actuator next time. Accordingly, it becomes possible to set a start frequency that can cancel changes in the actuator characteristics due to changes in the environmental parameters and external parameters.

An operation to be performed when the target speed is in the low-speed region and only the pulse width control is performed as the speed control will be described below.

When the pulse width is gradually increased to accelerate the vibratory actuator (acceleration operation) and the detected speed reaches the target speed (YES in step F-03), then in step F-14, the control apparatus 111 performs the pulse width control. More specifically, the control apparatus 111 increases and decreases the pulse width based on the difference (velocity error) between the detected speed and the target speed. In this case, the driving frequency is maintained (fixed) constant. When the low-speed operation is continued and the vibratory actuator reaches the stop position (YES in step F-15), then in step F-13, the control apparatus 111 stops driving the vibratory actuator (turns the motor OFF).

In a case where only the frequency control is performed, the start frequency is not updated.

For this reason, in a case where the vibratory actuator is driven after the vibratory actuator is left undriven for a prolonged period of time, some measures need to be taken. To avoid abruptly driving the vibratory actuator only in the low-speed region (only in the pulse width control), for example, it is necessary to incorporate a reset operation, select the frequency control, and then update the start frequency.

According to the present exemplary embodiment (first exemplary embodiment), when the target speed is in the high-speed region, the control apparatus 111 performs a combination of the pulse width control and the frequency control as the speed control. However, instead of the pulse width control, the voltage control may be performed for changing the switching voltage so that almost the same effect can be obtained.

Figure 4:
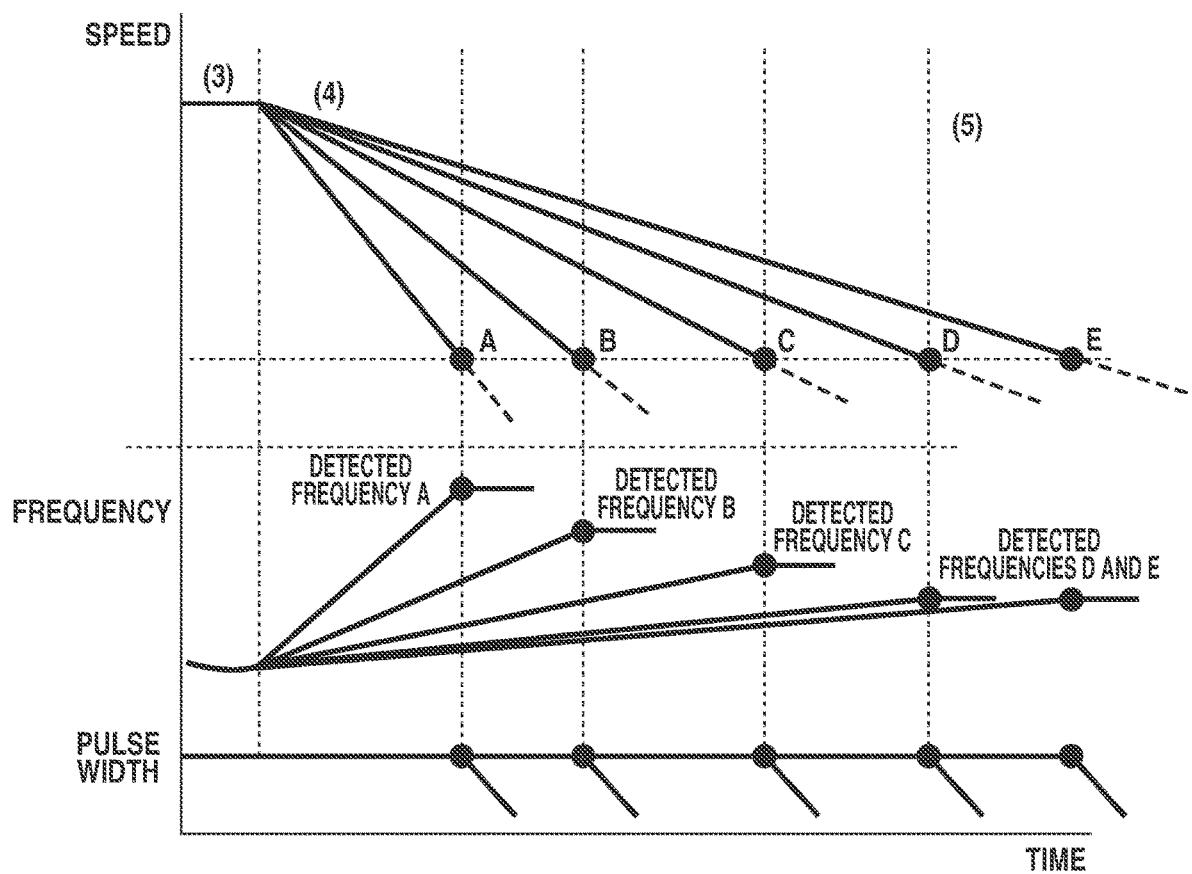
FIG. 4 illustrates a relation between the time, speed, frequency, and pulse width in a vibratory driving apparatus according to a second exemplary embodiment.

A second exemplary embodiment will be described below with reference to FIGS. 4, 5 and 6. FIG. 4 illustrates the operation (deceleration operation) in the regions (4) and (5) from the operation in the region (3) according to the first exemplary embodiment, i.e., the operation to be performed when the deceleration inclination is changed in the deceleration operation.

The straight line passing through A represents the largest deceleration inclination that is the absolute value of the ratio of the variation of speed to the variation of time (|variation of speed/variation of time|). The straight line passing through A, the straight line passing through B, the straight line passing through C, the straight line passing through D, and the straight line passing through E provide the larger deceleration inclinations in this order. More specifically, the deceleration inclination decreases in order of the straight line passing through A, the straight line passing through B, the straight line passing through C, the straight line passing through D, and the straight line passing through E. Hereinafter, the deceleration inclination represented by the straight line passing through A is referred to as a deceleration inclination A. Likewise, the deceleration inclination represented by the straight line passing through B, the deceleration inclination represented by the straight line passing through C, the deceleration inclination represented by the straight line passing through the deceleration inclination D, and the deceleration inclination represented by the straight line passing through E are referred to as a deceleration inclination B, a deceleration inclination C, a deceleration inclination D, and a deceleration inclination E, respectively.

The driving frequencies A to E in FIG. 4 are driving frequencies (stored frequencies) used when the driving speed reaches the stored speed for the deceleration inclinations A to E. Like the first exemplary embodiment, when the driving speed reaches the stored speed, the control apparatus 111 deceases the pulse width while maintaining (fixing) the driving frequency, to decelerate the vibratory actuator and then deactivate the vibratory actuator at the stop position. Then, the control apparatus 111 stores the maintained (fixed) driving frequency (stored frequency). The control apparatus 111 sets the stored frequency as the start frequency to be used when the control apparatus 111 starts to drive (activate) the vibratory actuator next time.

As illustrated in FIG. 4, the driving frequency corresponding to the stored speed for the deceleration inclination A (detected frequency A) is higher than the driving frequencies corresponding to the stored speeds for the deceleration inclinations B to E (detected frequencies B to E).

The acceleration in the deceleration operation (deceleration acceleration) is required because of an action of an inertial force during deceleration due to the inertia of a driven member driven by the vibratory actuator included in the apparatus. Accordingly, FIG. 4 illustrates that a driving frequency lower than the driving frequency corresponding to the stored speed (detected frequency) is set as the stored frequency so that a suitable stored frequency can be obtained.

FIG. 4 also illustrates that the influence of the inertial force increases as the deceleration inclination increases. In this case, the driving frequency corresponding to the stored speed also increases.

For this reason, when the deceleration inclination is smaller than the deceleration inclination A, like the deceleration inclinations B and C, the driving frequencies B and C corresponding to the stored speed (detected frequencies B and C) have a tendency to become lower than the driving frequency A (detected frequency A). When the deceleration by the deceleration inclination such as the deceleration inclinations D and E is gentle to such an extent that the deceleration is not affected by the inertial force, the driving frequency converges to the driving frequencies D and E that are further lower than the driving frequencies B and C.

The driving frequency (detected frequency) corresponding to the stored speed changes in this way depending on the deceleration inclination.

Figure 5:
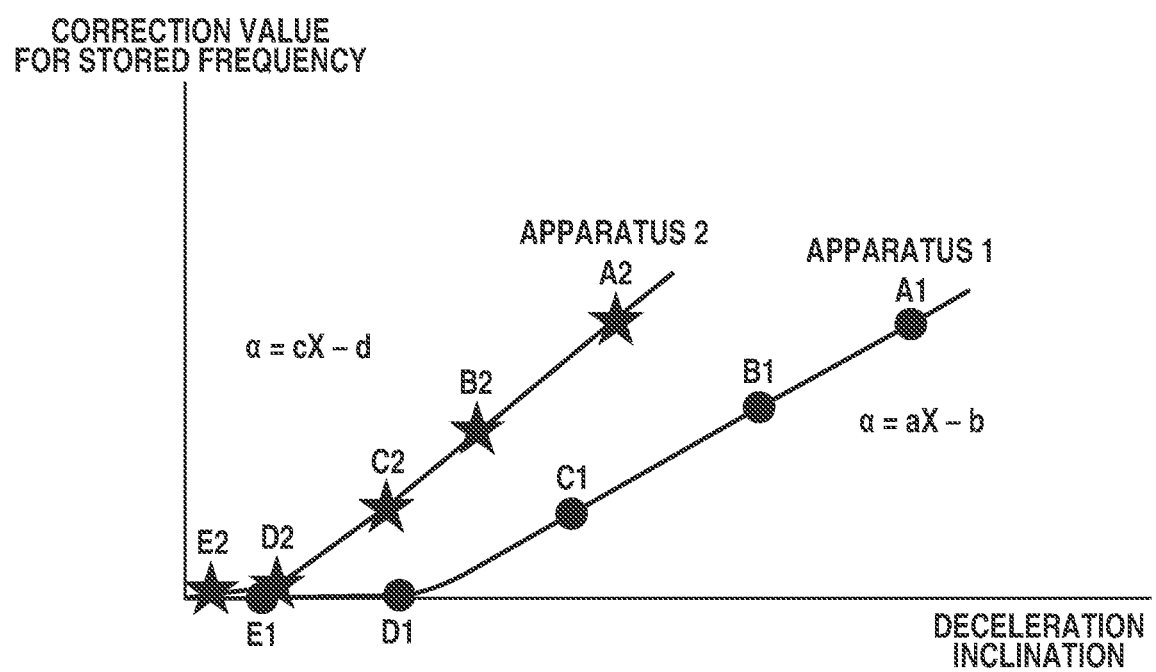
FIG. 5 illustrates a relation between a deceleration inclination and a stored frequency correction value in the vibratory driving apparatus according to the second exemplary embodiment.

FIG. 5 illustrates an example of calculating the stored frequency correction value α (hereinafter the stored frequency correction value is simply referred to as a "correction value") based on the deceleration inclination. With the vibratory actuator control apparatus according to the present exemplary embodiment (second exemplary embodiment), when the deceleration inclination is smaller than the deceleration inclination D, the correction value α is calculated to be 0. When the deceleration inclination is larger than the deceleration inclination D, the correction value α is calculated to be ax−b. Since α is the correction value, the driving frequency (detected frequency) corresponding to the predetermined driving speed (stored speed) plus α is set as the stored frequency.

For example, in a case of an apparatus (hereinafter referred to as an "apparatus 1") having the following characteristics, a=(50500−50000)/(100−20)=6.25 and b=125 are given. The apparatus 1 has characteristics that the detected frequency is 50,500 Hz (point A1) with a deceleration inclination of 100 Hz/1 msec, the detected frequency is 50,000 Hz (point D1) with a deceleration inclination of 20 Hz/1 msec, and the detected frequency is 50,000 Hz (point E1) with a deceleration inclination of 10 Hz/1 msec.

In this case, the correction value α for the deceleration inclination 60 Hz/1 msec at point B1 is 6.25*60−125=250 Hz. The detected frequency is calculated to be 50,000 Hz+250 Hz=50,250 Hz.

Accordingly, the detected frequency minus the above-described correction value α (50,250 Hz−250 Hz=50,000 Hz) is set as the stored frequency.

The correction value is determined based on such factors as the inertia of the driven member driven by the vibratory actuator and the weight of the load. When the deceleration inclination is smaller than a deceleration inclination D2, the correction value α is calculated to be 0. When the deceleration inclination is larger than the deceleration inclination D2, the correction value α is calculated to be cx−d.

For example, in a case of an apparatus (hereinafter referred to as an "apparatus 2") having the following characteristics, c=(50500−50000)/(50−10)=12.5 and d=125 are given. The apparatus 2 has characteristics that the detected frequency is 50,500 Hz (point A2) with a deceleration inclination of 50 Hz/1 msec, the detected frequency is 50,000 Hz (point D2) with a deceleration inclination of 10 Hz/1 msec, and the detected frequency is 50,000 Hz (point E2) with a deceleration inclination of 5 Hz/1 msec.

In this case, the correction value α for the deceleration inclination 20 Hz/1 msec. at point C2 is calculated to be 12.5*20−125=125 Hz. The detected frequency is calculated to be 50,000 Hz+125 Hz=50,125 Hz.

Accordingly, the detected frequency minus the above-described correction value α (50,150 Hz−125 Hz=50,000 Hz) is set as the stored frequency.

According to the present exemplary embodiment (second exemplary embodiment), the speed inclination during deceleration is increased to reduce the driving time.

As a result, in consideration of a frequency shift between the frequency of the stored speed and the frequency corresponding to the stored speed in the stationary state, the control apparatus 111 calculates and corrects the frequency correction value α and then sets the value as the start frequency to be used when the control apparatus 111 starts to drive (activate) the vibratory actuator next time. In this case, coefficients α to d may be measured in advance depending on the apparatus configuration. Alternatively, a certain unit calculates the coefficients based on the acceleration in the deceleration operation, and the inertia, inertial force, load of the vibratory actuator and the driven member driven by the vibratory actuator.

Figure 6:
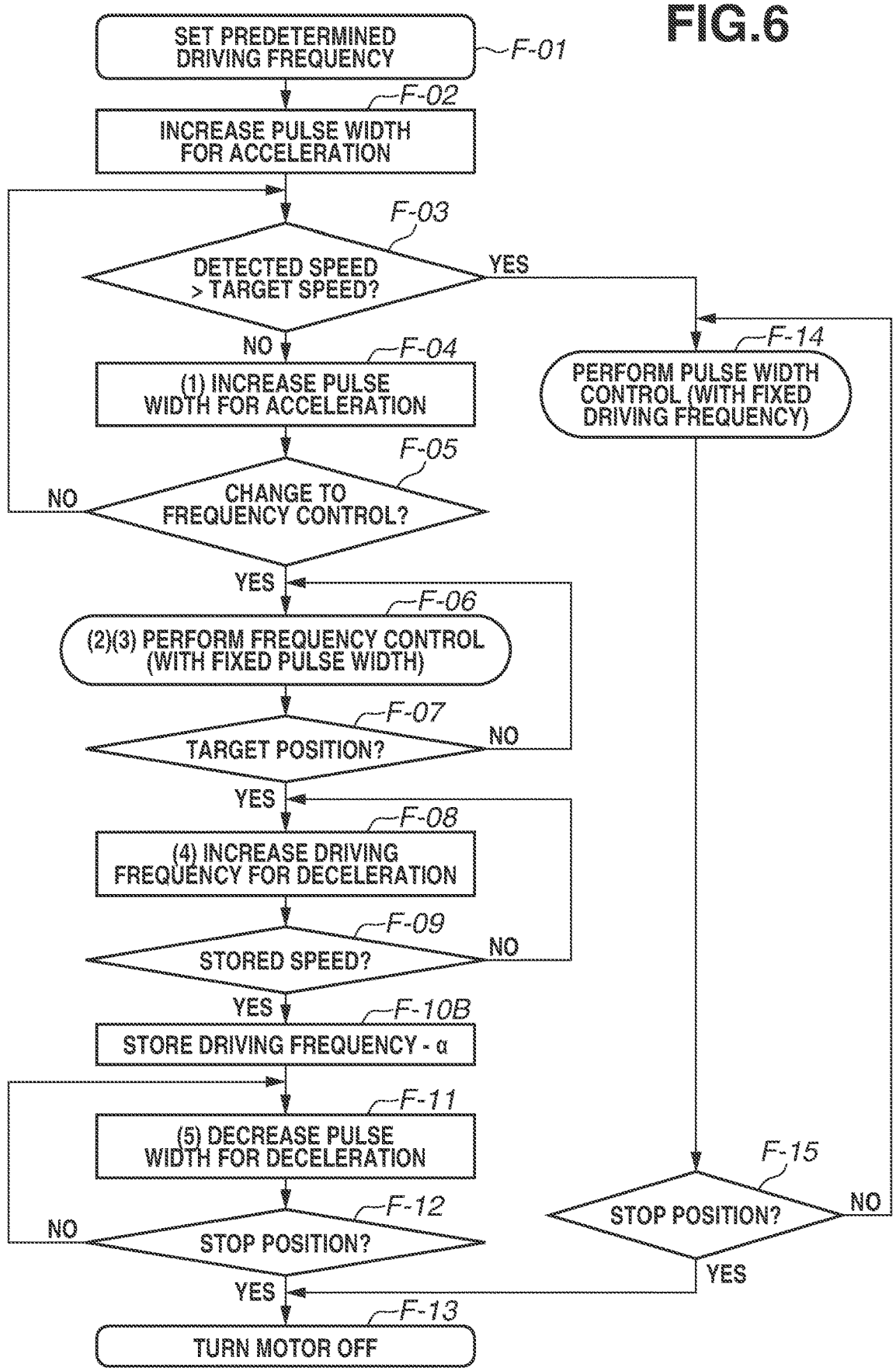
FIG. 6 is a flowchart illustrating an algorithm according to the second exemplary embodiment.

FIG. 6 is a flowchart illustrating an algorithm according to the present exemplary embodiment (second exemplary embodiment). With reference to FIG. 3 (flowchart) illustrating the algorithm according to the first exemplary embodiment, in step F-10A, the control apparatus 111 stores the driving frequency when the driving speed reaches the stored speed, as the stored frequency. On the other hand, with reference to the flowchart (FIG. 6) according to the second exemplary embodiment, in step F-10B, the control apparatus 111 stores the driving frequency when the driving speed reaches the stored speed minus the correction value α according to the deceleration inclination, as the stored frequency, in consideration of the above-described tendency. The control apparatus 111 sets the stored frequency as the start frequency to be used when the control apparatus 111 starts to drive (activate) the vibratory actuator next time.

In this way, according to the present exemplary embodiment (second exemplary embodiment), it is possible to suitably set the start frequency to be used when the control apparatus 111 starts to drive (activate) the vibratory actuator next time even if the deceleration inclination is increased and the driving time is reduced.

Although, in the present exemplary embodiment (second exemplary embodiment), the stored frequency is corrected, the control apparatus 111 may not correct the stored frequency but use the deceleration inclination in the region where the correction value in FIG. 5 is zero.

A third exemplary embodiment will be described below with reference to FIGS. 7A, 7B, 8 and 9.

According to the first exemplary embodiment, the control apparatus 111 changes the driving speed by changing the pulse width during low-speed driving including the timing of starting to drive (activate) the vibratory actuator and the timing of deactivating the vibratory actuator. However, according to the present exemplary embodiment (third exemplary embodiment), the control apparatus 111 changes the driving speed by changing the phase difference between the alternating voltage (AC signal) for producing the A-mode vibration and the alternating voltage (AC signal) for producing the B-mode vibration (AB phase difference, hereinafter also simply referred to as a "phase difference"). A control method for changing the driving speed by changing the phase difference is referred to as phase difference control.

Figure 7A:
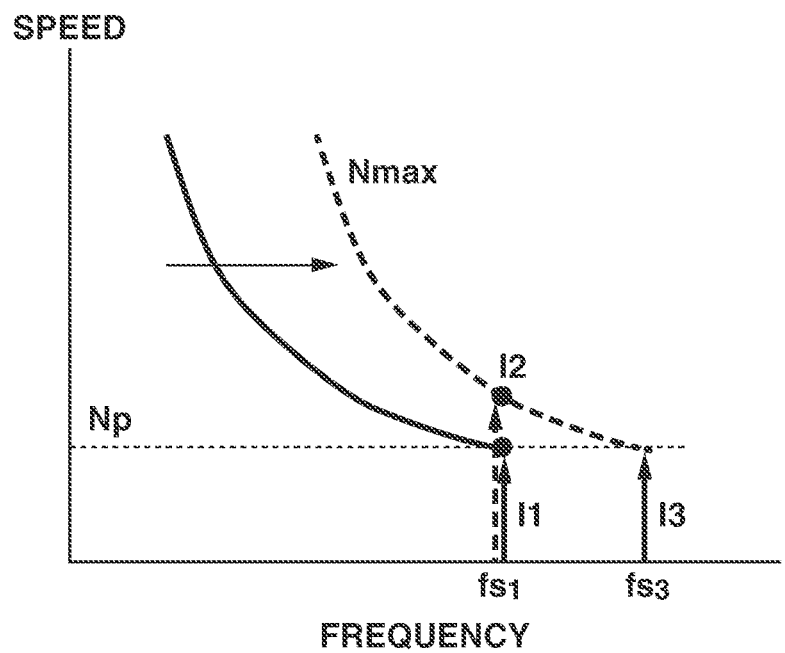
FIG. 7A illustrates a relation between the frequency and the speed in a vibratory driving apparatus according to a third exemplary embodiment.
Figure 7B:
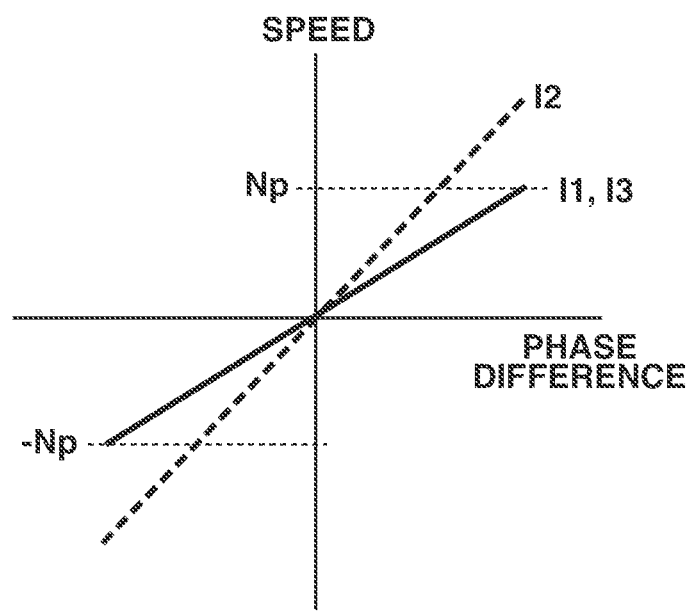
FIG. 7B illustrates a relation between the phase difference and the speed in a vibratory driving apparatus according to the third exemplary embodiment.

FIGS. 7A and 7B illustrate a means for coping with changes in the environmental parameters and external parameters in the vibratory actuator control apparatus according to the present exemplary embodiment (third exemplary embodiment). FIG. 7A illustrates a relation between the frequency and the speed (frequency characteristic). FIG. 7B illustrates a relation between the phase difference and the speed (phase difference characteristic).

With reference to FIG. 7A, $fs_1$ indicates the start frequency. A relation between the phase difference and the driving direction depends on the configuration of the vibratory actuator. According to the present exemplary embodiment (third exemplary embodiment), the relation between the phase difference and the driving direction is as follows. The driving speed in the positive direction increases as the phase difference in the positive direction increases, and the driving speed in the negative direction increases as the phase difference in the negative direction increases.

I1 indicates the phase difference characteristic corresponding to the frequency characteristic of the solid line when the start frequency is $fs_1$. I2 indicates the phase difference characteristic corresponding to the frequency characteristic of the dotted line when the start frequency is $fs_1$. I3 indicates the phase difference characteristic corresponding to the frequency characteristic of the dotted line when the start frequency is $fs_3$.

According to the present exemplary embodiment (third exemplary embodiment), when the frequency characteristic is shifted (changed) from the solid line to the dotted line in FIG. 7A due to changes in the environmental parameters and external parameters, the control apparatus 111 changes the start frequency from $fs_1$ to $fs_3$. As illustrated in FIG. 7B, the phase difference characteristic changes from the inclination I2 to the inclination I3 that is same as the inclination I1 as the optimum inclination.

When the control characteristics of the vibratory actuator with respect to the driving frequency are changed due to changes in the environmental parameters and external parameters, the control apparatus 111 changes the start frequency from $fs_1$ to $fs_3$ so that the same control as the conventional control can be performed.

The present exemplary embodiment (third exemplary embodiment) is provided with a means for determining $fs_3$ (vibratory actuator control apparatus). The vibratory actuator control apparatus will be described in detail below.

Figure 8:
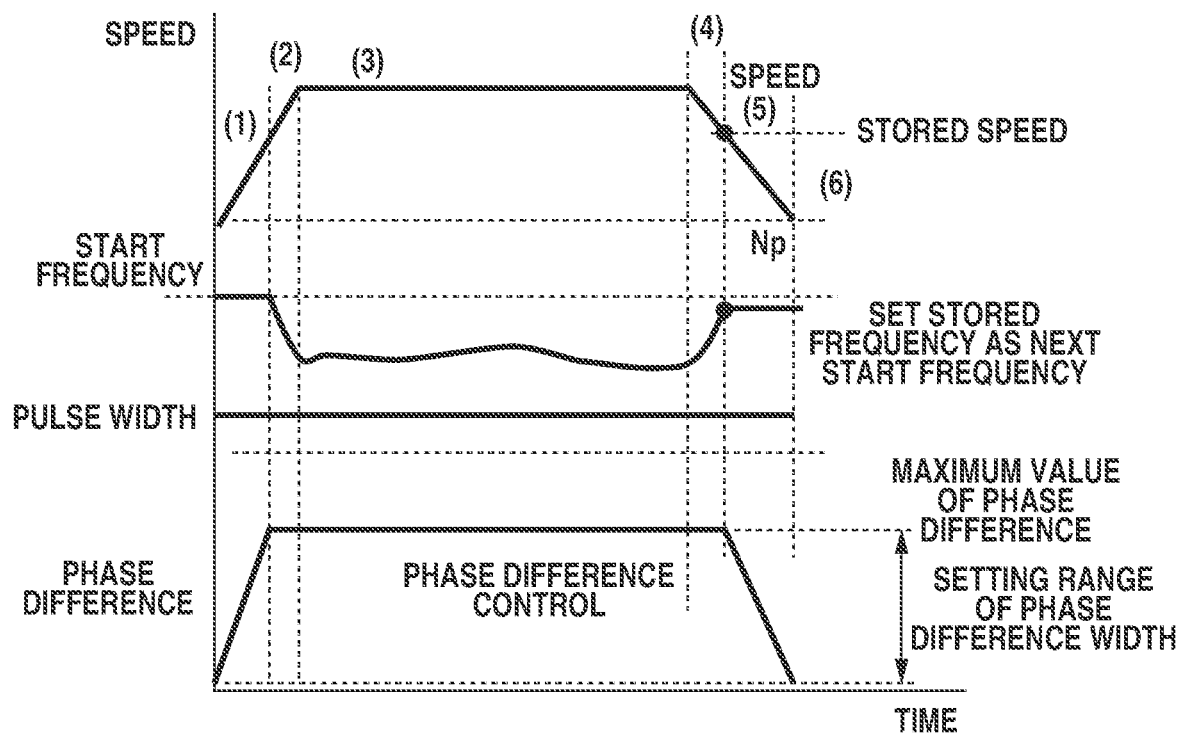
FIG. 8 illustrates a relation between the time, speed, frequency, pulse width, and phase difference in the vibratory driving apparatus according to the third exemplary embodiment.

FIG. 8 illustrates an operation for controlling the vibratory actuator and an operation for acquiring a switching frequency between the phase difference control and the frequency control according to the present exemplary embodiment (third exemplary embodiment). The horizontal axis indicates time, and the vertical axis indicates the speed, frequency, pulse width, and phase difference. According to the present exemplary embodiment (third exemplary embodiment), the control apparatus 111 changes the phase difference while maintaining the pulse width constant so that control can be performed in the low-speed control region.

Figure 9:
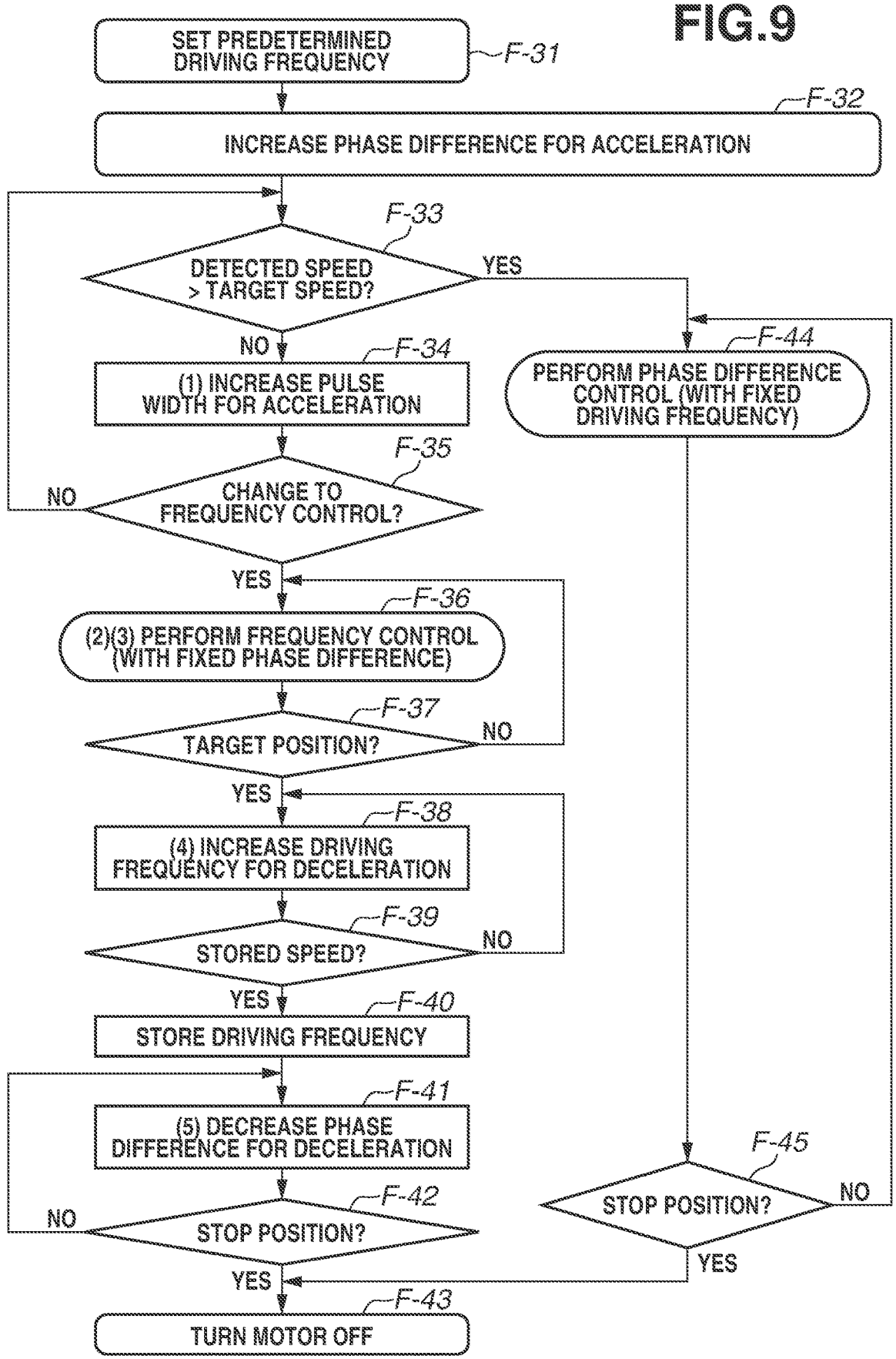
FIG. 9 is a flowchart illustrating an algorithm according to the third exemplary embodiment.

FIG. 9 is a flowchart illustrating an algorithm according to the present exemplary embodiment (third exemplary embodiment). The flowchart in FIG. 9 will be described below with reference to FIGS. 7 and 8.

The speed control according to the present exemplary embodiment (third exemplary embodiment) will be described below. As the speed control, the phase difference control is performed in the low-speed region and the frequency control is performed in the high-speed region.

In step F-31, before the control apparatus 111 starts to drive (activate) the vibratory actuator, the control apparatus 111 sets the frequency predetermined based on the premeasured actuator characteristics as the driving frequency (start frequency $fs_1$).

In step F-32, the control apparatus 111 starts the phase difference control. More specifically, the control apparatus 111 maintains (fixes) the driving frequency at the preset driving frequency (start frequency) when the control apparatus 111 starts to drive (activate) the vibratory actuator, and then increases the absolute value of the phase difference to accelerate the vibratory actuator. In this case, to start to smoothly drive (activate) the vibratory actuator, the control apparatus 111 gradually increases the absolute value of the phase difference to accelerate the vibratory actuator.

When the detected speed detected by the position detection unit 13 is equal to or lower than the target speed (NO in step F-33), then in steps F-34, F-35 (NO), F-33 (NO), and F-34 . . . , the control apparatus 111 repeats operations for gradually increasing the pulse width to accelerate the vibratory actuator. The above-described operation is the operation in the region (1) in FIG. 8 (first stage).

When the phase difference becomes a predetermined value (when the phase difference reaches the maximum value in a settable range) (YES in step F-35), then in step F-36, the control apparatus 111 selects the frequency control. More specifically, the control apparatus 111 changes the driving frequency while maintaining (fixing) the phase difference at the predetermined value (hereinafter the maximum value is referred to as the "phase difference maximum value").

In step F-36, in the frequency control, to increase the driving speed until the detected speed of the vibratory actuator reaches the target speed, the control apparatus 111 decreases the driving frequency to accelerate the vibratory actuator. The operation is the operation in the region (2) in FIG. 8 (second stage). The operation that sequentially passes through the regions (1) and (2) in FIG. 8 in this order is the operation performed when the states of the vibrating member and the contact member included in the vibratory actuator are changed from the stopped state to the stationary state (first case).

In step F-36, in the frequency control, when the detected speed reaches the target speed, the control apparatus 111 increases and decreases the driving frequency based on the difference (velocity error) between the detected speed of the vibratory actuator and the target speed. The operation is the operation in the region (3) in FIG. 8 (stationary state operation).

In brief, in the frequency control, the control apparatus 111 performs the acceleration control until the detected speed reaches the target speed and performs the constant speed control in which the driving speed is stabilized at the target speed.

When the vibratory actuator comes close to the target position (YES in step F-37), then in step F-38, the control apparatus 111 starts a deceleration operation. More specifically, the control apparatus 111 increases the driving frequency while maintaining the phase difference constant, to decelerate the vibratory actuator. The operation is the operation in the region (4) in FIG. 8 (third stage). The control apparatus 111 can determine whether the vibratory actuator comes close to the target position, for example, by determining whether the number of pulses produced by an incremental encoder becomes close to the set number of pulses.

When the deceleration is continued and the speed is decreased to a predetermined driving speed (stored speed) at which the stored frequency is to be stored (YES in step F-39), then in step F-40A, the control apparatus 111 stores the driving frequency when the driving speed reaches the stored speed (stored frequency).

The stored speed is represented by Np illustrated in FIGS. 7A and 7B, and is a preset speed suitable for switching the control operation between the phase difference control and the frequency control. The driving frequency when the driving speed reaches the stored speed (switching frequency) is set as the stored frequency.

In step F-41, the control apparatus 111 continues the deceleration operation. More specifically, the control apparatus 111 decreases the absolute value of the phase difference while maintaining (fixing) the driving frequency at the stored frequency, to decelerate the vibratory actuator. The operation is the operation in the region (5) in FIG. 8 (fourth stage). The operation that sequentially passes through the region (4) (third stage) and the region (5) (fourth stage) in FIG. 8 in this order is the operation to be performed when the states of the vibrating member and the contact member included in the vibratory actuator are changed from the stationary state to the stopped state.

When the vibratory actuator reaches the target position (stop position) (YES in step F-42), then in step F-43, the control apparatus 111 stops driving the vibratory actuator (turns the motor OFF) to stop the vibratory actuator. The operation is the operation in the region (6) in FIG. 8.

Also, according to the present exemplary embodiment (third exemplary embodiment), the control apparatus 111 stores the driving frequency when the driving speed reaches the stored speed in the third stage (stored frequency) and then sets the stored frequency as the start frequency to be used when the control apparatus 111 starts to drive (activate) the vibratory actuator next time. Accordingly, it becomes possible to set a start frequency that can cancel changes in the actuator characteristics due to changes in the environmental parameters and external parameters.

An operation to be performed when the target speed is in the low-speed region (an operation to be performed in a case where only the phase difference control is performed as speed control) will be described below.

When the absolute value of the phase difference is gradually increased to accelerate the vibratory actuator (acceleration operation) and the detected speed reaches the target speed (YES in step F-33), then in step F-44, the control apparatus 111 performs the phase difference control. More specifically, the control apparatus 111 increases and decreases the absolute value of the phase difference based on the difference (velocity error) between the detected speed and the target speed. In this case, the driving frequency is maintained (fixed) constant. When the low-speed operation is continued and the vibratory actuator reaches the stop position (YES in step F-45), then in step F-43, the control apparatus 111 stops driving the vibratory actuator (turns the motor OFF).

In a case where only the phase difference control is performed, the start frequency is not updated.

In a case where the vibratory actuator is driven after the vibratory actuator is left for a prolonged period of time, some measures need to be taken. To avoid abruptly driving the vibratory actuator only in the low-speed region (only in the phase difference control), for example, it is necessary to incorporate a reset operation, select the frequency control, and then update the start frequency. In the descriptions of the algorithm according to the present exemplary embodiment (third exemplary embodiment), the control apparatus 111 increases the absolute value of the phase difference to accelerate the vibratory actuator. This means that, in the range of the positive phase difference for driving in the positive direction, the control apparatus 111 increases the phase difference to increase the absolute value of the phase difference to accelerate the vibratory actuator. This also means that, in the range of the negative phase difference for driving in the negative direction, the control apparatus 111 decreases the phase difference to increase the absolute value of the phase difference to accelerate the vibratory actuator.

A fourth exemplary embodiment will be described below with reference to FIGS. 10 and 11.

According to the first exemplary embodiment, the control apparatus 111 stores the driving frequency corresponding to the stored speed when the control apparatus 111 decelerates the vibratory actuator, as the stored frequency. However, according to the present exemplary embodiment (fourth exemplary embodiment), the control apparatus 111 stores the driving frequency corresponding to the stored speed used when the control apparatus 111 starts to drive (activate) the vibratory actuator, as the stored frequency.

Figure 10:
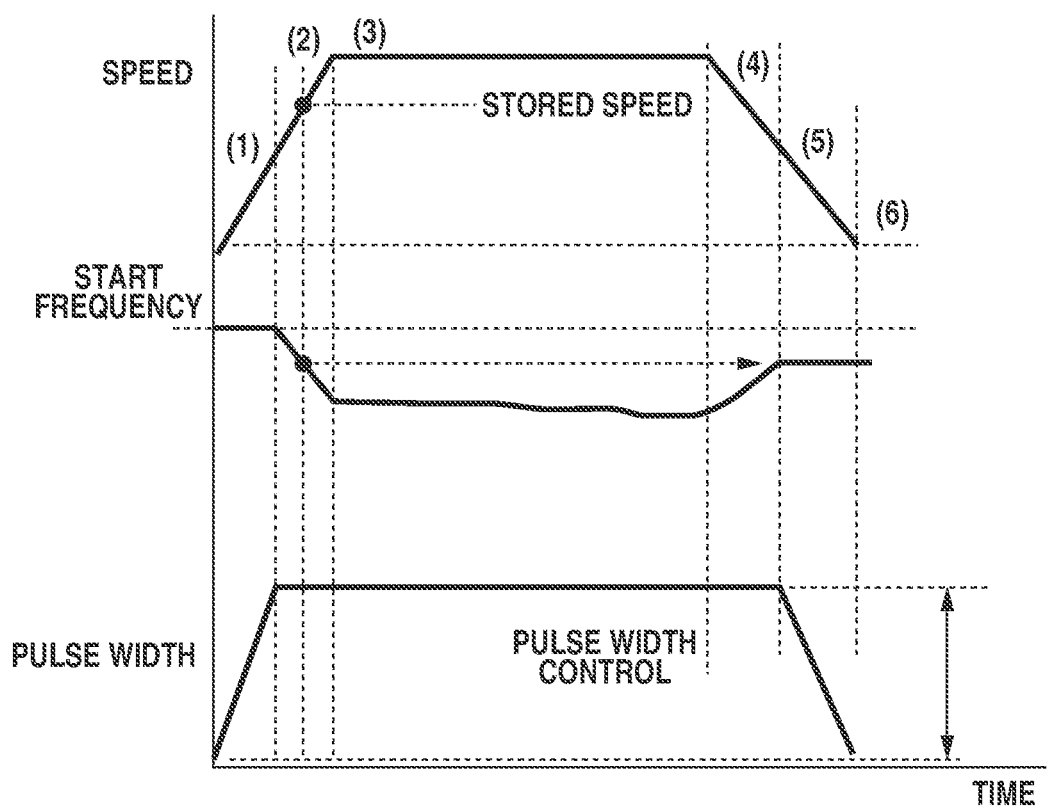
FIG. 10 illustrates a relation between the time, speed, frequency, and pulse width in a vibratory driving apparatus according to a fourth exemplary embodiment.

FIG. 10 illustrates an operation for controlling the vibratory actuator and an operation for acquiring a switching frequency between the pulse width control and the frequency control according to the present exemplary embodiment (fourth exemplary embodiment). The horizontal axis indicates time and the vertical axis indicates the speed, driving frequency, and pulse width.

Figure 11:
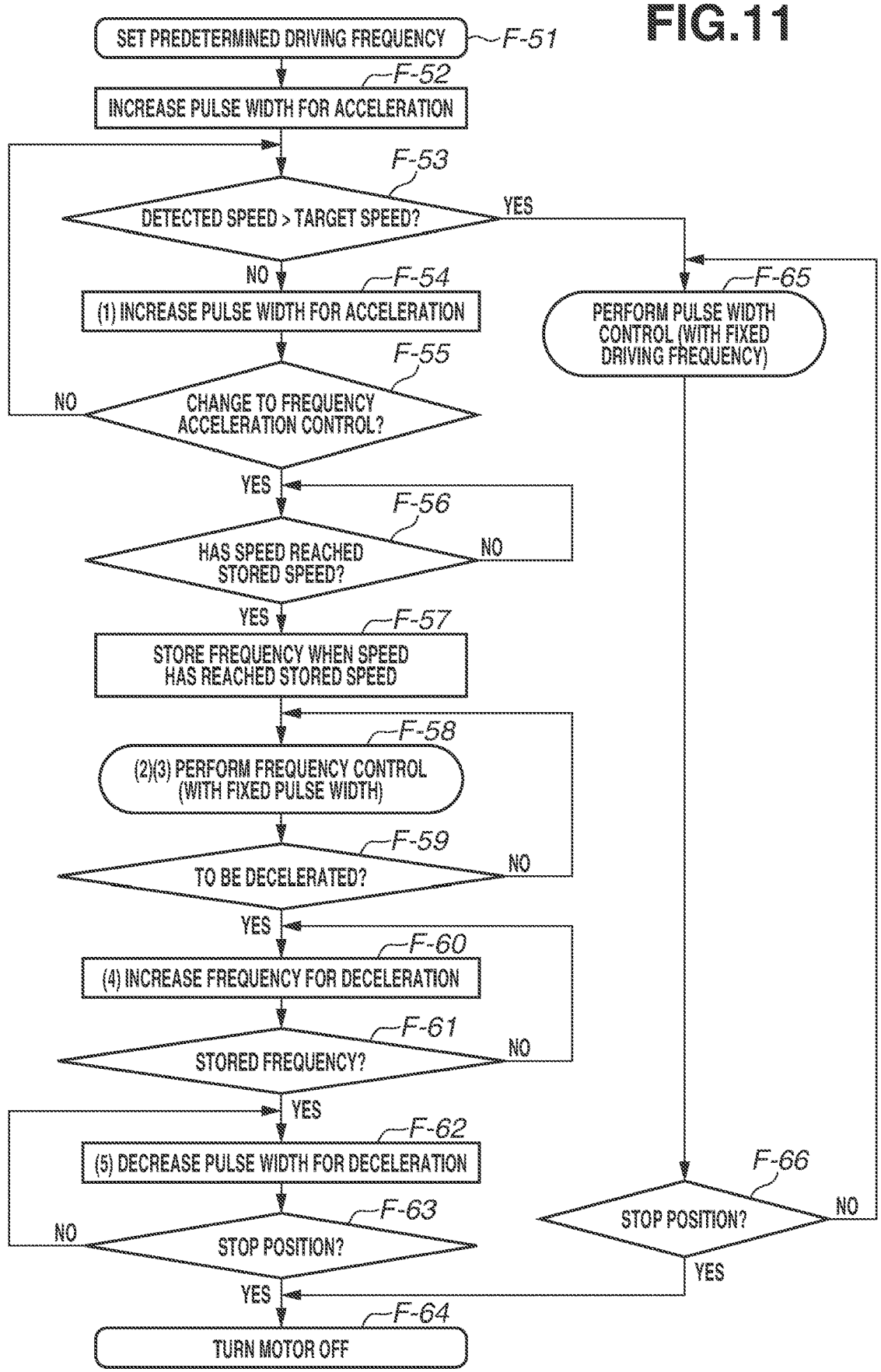
FIG. 11 is a flowchart illustrating an algorithm according to the fourth exemplary embodiment.

FIG. 11 is a flowchart illustrating an algorithm according to the present exemplary embodiment (fourth exemplary embodiment).

The flowchart in FIG. 11 will be described below with reference to FIG. 10.

The speed control according to present exemplary embodiment (fourth exemplary embodiment) will be described below. As the speed control, the pulse width control is performed in the low-speed region and the frequency control is performed in the high-speed region.

In step F-51, before the control apparatus 111 starts to drive (activate) the vibratory actuator, the control apparatus 111 sets the frequency predetermined based on the premeasured actuator characteristics as the driving frequency (start frequency $fs_1$).

In step F-52, the control apparatus 111 starts the pulse width control. More specifically, the control apparatus 111 maintains (fixes) the driving frequency at the preset driving frequency (start frequency) when the control apparatus 111 starts to drive (activate) the vibratory actuator, and then increases the pulse width (driving voltage control parameter) to accelerate the vibratory actuator. In this case, to start to smoothly drive (activate) the vibratory actuator, the control apparatus 111 gradually increases the pulse width to accelerate the vibratory actuator.

When the detected speed detected by the position detection unit 13 is equal to or lower than the target speed (NO in step F-53), then in steps F-54, F-55 (NO), F-53 (NO), and F-54 . . . , the control apparatus 111 repeats operations for gradually increasing the pulse width to accelerate the vibratory actuator. The above-described operation is the operation in the region (1) in FIG. 10 (first stage).

When the pulse width becomes a predetermined value (when the pulse width reaches the maximum value in a settable range) (YES in step F-55), then in step F-56, the control apparatus 111 selects the frequency acceleration control. More specifically, the control apparatus 111 changes the driving frequency while maintaining (fixing) the pulse width to the predetermined value, to accelerate the vibratory actuator (hereinafter the maximum value is referred to as the "pulse width maximum value").

In the frequency acceleration control, the control apparatus 111 continues the frequency-based acceleration control. More specifically, to increase the driving speed until the detected speed of the vibratory actuator reaches the stored speed, the control apparatus 111 decreases the driving frequency to accelerate the vibratory actuator. When the speed of the vibratory actuator becomes (reaches) the stored speed that provides favorable controllability in the pulse width control (YES in step F-56), then in step F-57, the control apparatus 111 stores the frequency at that time as the stored frequency.

In step F-58, in the frequency control, to increase the driving speed until the detected speed of the vibratory actuator reaches the target speed, the control apparatus 111 decreases the driving frequency to accelerate the vibratory actuator. The operation is the operation in the region (2) in FIG. 10 (second stage). The operation that sequentially passes through the regions (1) and (2) in FIG. 10 in this order is the operation to be performed in a case where the states of the vibrating member and the contact member included in the vibratory actuator are changed from the stopped state to the stationary state (first case).

In step F-58, in the frequency control, when the detected speed reaches the target speed, the control apparatus 111 increases and decreases the driving frequency according to the difference (velocity error) between the detected speed of the vibratory actuator and the target speed. The operation is the operation in the region (3) in FIG. 10 (stationary state operation).

In brief, in the frequency control, the control apparatus 111 performs the acceleration control until the detected speed reaches the target speed and the constant speed control in which the driving speed is stabilized at the target speed.

When the vibratory actuator comes close to the target position (YES in step F-59), then in step F-60, the control apparatus 111 starts a deceleration operation. More specifically, the control apparatus 111 increases the driving frequency while maintaining the pulse width (driving voltage control parameter) constant, to decelerate the vibratory actuator. The operation is the operation in the region (4) in FIG. 10 (third stage). The control apparatus 111 can determine whether the vibratory actuator comes close to the target position, for example, by determining whether the number of pulses produced by an incremental encoder becomes close to the set number of pulses.

When the deceleration is continued and the driving frequency is increased to a preset stored frequency (YES in step F-61), the control apparatus 111 holds (fixes) the driving frequency to the stored frequency.

In step F-62, after the control apparatus 111 holds (fixes) the driving frequency to the stored frequency, the control apparatus 111 decreases the pulse width to continue the deceleration. The operation is the operation in the region (5) in FIG. 10 (fourth stage). The operation that sequentially passes through the region (4) (third stage) and the region (5) (fourth stage) in FIG. 10 in this order is the operation to be performed in a case where the states of the vibrating member and the contact member included in the vibratory actuator are changed from the stationary state to the stopped state. When the vibratory actuator reaches the target position (stop position) (YES in step F-63), then in step F-64, the control apparatus 111 stops driving the vibratory actuator (turns the motor OFF) to stop the vibratory actuator. The operation is the operation in the region (6) in FIG. 10.

According to the present exemplary embodiment (fourth exemplary embodiment), the control apparatus 111 stores the driving frequency when the detected speed reaches the stored speed in the second stage (stored frequency) and then sets the stored frequency as the driving frequency to be used when the control apparatus 111 selects the pulse width control next time and as the start frequency to be used when the control apparatus 111 starts to drive (activate) the vibratory actuator next time. Accordingly, it becomes possible to set a start frequency that can cancel changes in the actuator characteristics due to changes in the environmental parameters and external parameters.

According to the present exemplary embodiment (fourth exemplary embodiment), since the control apparatus 111 stores the stored frequency for selecting the pulse width control in a stable operation when the control apparatus 111 starts to drive (activate) the vibratory actuator, it is not necessary to obtain the frequency corresponding to the stored speed during deceleration. Obtaining the frequency corresponding to the stored speed when the control apparatus 111 starts to drive (activate) the vibratory actuator and when the control apparatus 111 decelerates the vibratory actuator also enables acquiring the more correct start frequency to be used next time.

An operation to be performed when the target speed is in the low-speed region and only the pulse width control is performed as the speed control will be described below.

When the pulse width is gradually increased to accelerate the vibratory actuator (acceleration operation) and the detected speed reaches the target speed (YES in step F-53), then in step F-65, the control apparatus 111 performs the pulse width control. More specifically, the control apparatus 111 increases and decreases the pulse width based on the difference (velocity error) between the detected speed and the target speed. In this case, the driving frequency is maintained (fixed) constant. When the low-speed operation is continued and the vibratory actuator reaches the stop position (YES in step F-66), then in step F-64, the control apparatus 111 stops driving the vibratory actuator (turns the motor OFF).

In a case where only the pulse width control is performed, the start frequency is not updated.

Accordingly, in a case where the control apparatus 111 drives the vibratory actuator after the control apparatus 111 leaves the vibratory actuator for a prolonged period of time, some measures need to be taken. To avoid abruptly driving the vibratory actuator only in the low-speed region (only in the pulse width control), for example, it is necessary to incorporate a reset operation, select the frequency control, and then update the start frequency.

According to the present exemplary embodiment (fourth exemplary embodiment), when the target speed is in the high-speed region, the control apparatus 111 performs a combination of the pulse width control and the frequency control as the speed control. However, instead of the pulse width control, the control apparatus 111 performs the voltage control for changing the switching voltage so that almost the same effect can be obtained.

According to the first to the fourth exemplary embodiments, the control apparatus 111 stores the frequency that has exceeded the stored speed during driving operation and then sets the frequency as the next start frequency. However, with a temperature sensor and an orientation sensor provided in the apparatus, there may be provided a means for detecting that the last ending state has changed to the current driving state, and correcting and setting the start frequency in response to the state transition.

A fifth exemplary embodiment will be described below with reference to FIG. 12.

Figure 12:
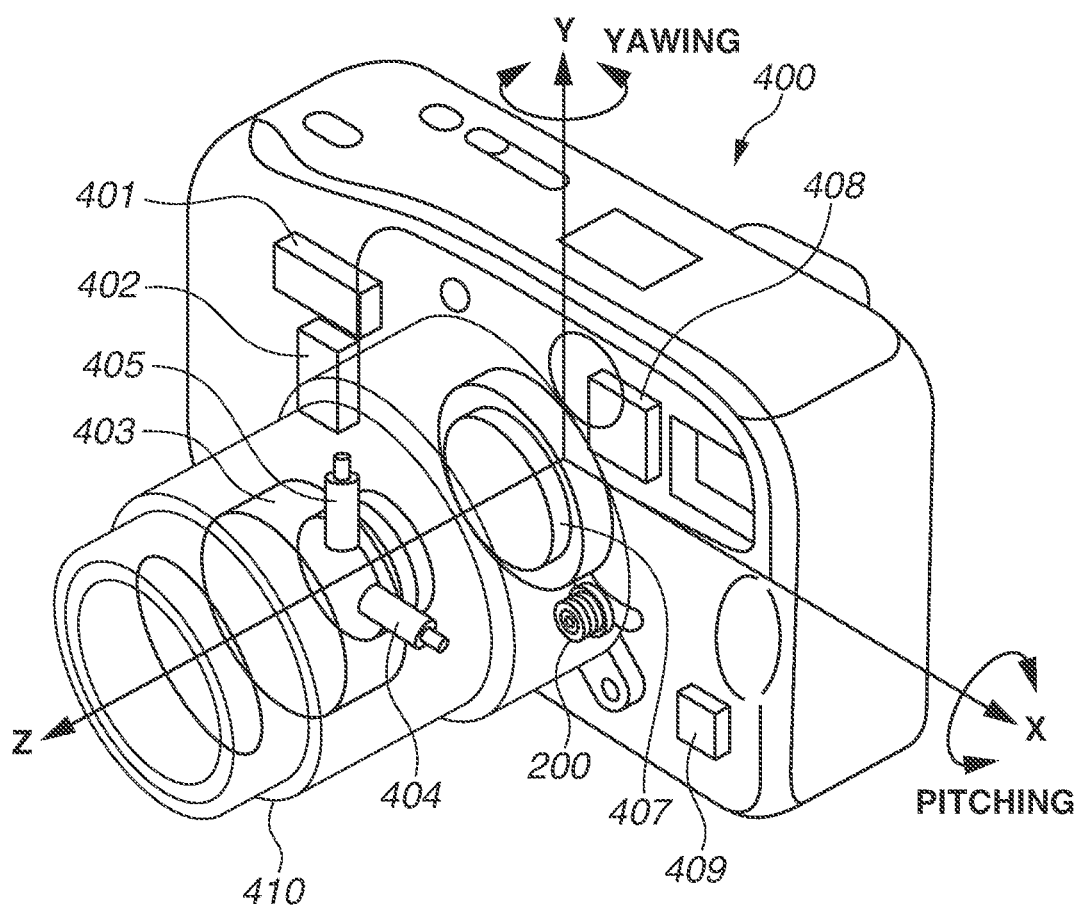
FIG. 12 illustrates a camera apparatus (imaging apparatus) using the vibratory actuator control apparatus of the present disclosure.

FIG. 12 is a schematic perspective view illustrating the camera apparatus (imaging apparatus) using the vibratory actuator of the present disclosure in a partly transparent state.

Like the first to the fourth exemplary embodiments, the hardware configuration of the vibratory driving apparatus according to the present exemplary embodiment (fifth exemplary embodiment) is the same as that of the vibratory driving apparatus in FIG. 1A. Accordingly, identical components are assigned the same reference numerals and redundant descriptions thereof will be omitted.

A lens barrel 410 is attached to the front face of a digital camera 400 (imaging apparatus). A plurality of lenses (not illustrated) including a focusing lens 407 (lens group) and a camera shake correction optical system 403 are disposed inside the barrel 410. The camera shake correction optical system 403 can vibrate in the vertical direction (Y direction) and the horizontal direction (X direction) when the rotations of 2-axis coreless motors 404 and 405 are transmitted.

The main body of the digital camera 400 (imaging apparatus) is provided with an image sensor 408 on which an optical image is formed by light passing through the barrel 410. The image sensor 408, a photoelectric conversion device such as a Complementary Metal Oxide Semiconductor (CMOS) sensor and a Charge Coupled Device (CCD) sensor, converts the optical image into an analog electrical signal. The analog electrical signal output from the image sensor 408 is converted into a digital signal by an analog-to-digital (A/D) converter (not illustrated), subjected to predetermined image processing by an image processing circuit (not illustrated), and then stored in a storage medium such as a semiconductor memory (not illustrated) as image data (video data).

The main body of the digital camera 400 (imaging apparatus) is provided with a gyro sensor 401 for detecting an amount of camera shake (vibration) in the vertical direction (pitching) and a gyro sensor 402 for detecting an amount of camera shake (vibration) in the horizontal direction (yawing) as internal apparatuses. The coreless motors 404 and 405 are driven in the direction opposite to the directions of the vibrations detected by the gyro sensors 401 and 402, to vibrate the optical axis extending in the Z direction of the camera shake correction optical system 403. As a result, the vibrations of the optical axis due to the camera shake are canceled, so that favorable photographs can be taken with camera shakes corrected.

The vibratory actuator 200 is driven by the driving apparatus according to the first to the fourth exemplary embodiments to drive the focusing lens 407 (lens group) disposed in the lens barrel 410 in the optical axis direction (Z direction), via a gear train (not illustrated). However, the present disclosure is not limited the example. The vibratory actuator 200 can be used to drive an arbitrary lens group in the optical axis direction. For example, the vibratory actuator 200 can be used to drive a zoom lens (lens group) (not illustrated) in the optical axis direction. For vibration insulation, the vibratory actuator 200 can be used to drive an arbitrary lens group in a direction perpendicular to the optical axis direction. For vibration insulation, for example, the vibratory actuator 200 can be used to drive the image sensor 408 in a direction perpendicular to the optical axis direction. The main body of the digital camera 400 (imaging apparatus) incorporates the driving apparatus illustrated in FIG. 13 to drive the vibratory actuator 200 by using the driving apparatus according to the first to the fourth exemplary embodiments, as a driving circuit 409.

By mounting the vibratory actuator having been subjected to the drive control according to the present disclosure on a camera apparatus (imaging apparatus) in this way, the vibratory actuator can be driven based on the stable drive control characteristics even if the environment parameters and external parameters, such as the operating temperature, change. As a result, photographs and moving images can be captured with favorable image quality.

The vibratory actuator is used to drive focusing lenses and zoom lenses of still cameras and video cameras. Recent still cameras and video cameras have functions of capturing still images and moving images. In still image capturing, the vibratory actuator operates at high speeds because a subject needs to be focused as fast as possible. In moving image capturing, the vibratory actuator needs to operate at low speeds because a subject needs to be tracked.

In this way, the vibratory actuator needs to operate at both high speeds and low speeds, and the lens needs to move at even speeds.

Because the vibratory actuator has a characteristic that the vibration frequency shifts due to changes in the environmental parameters and external parameters, such as the temperature, stable control characteristics can be obtained by adjusting the control characteristics in response to changes in the environment parameters and external parameters.

Particularly in the low-speed operation, a characteristic change causes a driving speed change, giving a sense of incongruity in a captured moving image.

Providing a function of adjusting the control characteristics in response to changes in the environment parameters and external parameters enables implementing a vibratory actuator that can be stably driven in which uneven speeds and oscillation are restricted to a further extent than conventional vibratory actuators. In this way, the moving image quality can be improved during zoom driving, and products can be developed for diverse applications.

The present disclosure provides a vibratory actuator control apparatus capable of restricting changes in control characteristics due to changes in actuator characteristics.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-165610, filed Oct. 7, 2021, which is hereby incorporated by reference herein in its entirety.

What is claimed is:

1. A vibratory actuator control apparatus comprising:
a vibrating member having an electro-mechanical energy conversion element;
a contact member configured to come into contact with the vibrating member; and
a controller configured to control relative movements of the vibrating member and the contact member due to vibrations to be generated when a driving voltage is applied to the electro-mechanical energy conversion element,
wherein, in a first case where the vibrating member and the contact member are brought from a stopped state to a stationary state, an operation sequentially passes through a first stage and a second stage,
wherein, in a second case where the vibrating member and the contact member are brought from the stationary state to the stopped state, the operation sequentially passes through a third stage and a fourth stage,
wherein the first stage is for accelerating a driving speed of the relative movements by applying the driving voltage while maintaining a driving frequency of the driving voltage at a start frequency and increasing a control parameter of the driving voltage,
wherein the second stage is for accelerating the driving speed by applying the driving voltage while maintaining the control parameter of the driving voltage constant and decreasing the driving frequency from the start frequency,
wherein the third stage is for decelerating the driving speed by applying the driving voltage while maintaining the control parameter of the driving voltage constant and increasing the driving frequency,
wherein the fourth stage is for decelerating the driving speed by applying the driving voltage while maintaining the driving frequency constant and decreasing the control parameter of the driving voltage,
wherein a next start frequency is set based on the driving frequency corresponding to a predetermined driving speed in the third stage,
wherein the next start frequency is the driving frequency corresponding to the predetermined driving speed in the third stage and corrected by a predetermined correction value, and
wherein the predetermined correction value is calculated based on a deceleration inclination in a deceleration operation to decelerate the driving speed in the third stage, an acceleration in the deceleration operation, and an inertia of a vibratory actuator driven by the vibratory actuator control apparatus and a driven member driven by the vibratory actuator.

2. The vibratory actuator control apparatus according to claim 1, wherein the control parameter of the driving voltage is a pulse width.

3. An imaging apparatus comprising:
a lens group;
an image sensor configured to capture an optical image formed by the lens group;
a vibratory actuator configured to drive the lens group; and
the vibratory actuator control apparatus according to claim 1 configured to drive the vibratory actuator.

4. An imaging apparatus comprising:
a lens group;
an image sensor configured to capture an optical image formed by the lens group;
a vibratory actuator configured to drive the image sensor; and
the vibratory actuator control apparatus according to claim 1 configured to drive the vibratory actuator.

* * * * *